(12) United States Patent
Ben Ayed

(10) Patent No.: US 8,935,691 B2
(45) Date of Patent: Jan. 13, 2015

(54) PROGRAM STORE FOR UPDATING ELECTRONIC DEVICES

(76) Inventor: Mourad Ben Ayed, Menlo Park, CA (US)

(*) Notice: Subject to any disclaimer, the term of this patent is extended or adjusted under 35 U.S.C. 154(b) by 481 days.

(21) Appl. No.: 13/235,645

(22) Filed: Sep. 19, 2011

(65) Prior Publication Data

US 2013/0073672 A1    Mar. 21, 2013

(51) Int. Cl.
*G06F 9/445*    (2006.01)

(52) U.S. Cl.
CPC ..................... *G06F 8/61* (2013.01)
USPC ........... 717/178; 717/171; 717/173; 717/175; 717/176; 717/169

(58) Field of Classification Search
CPC ..................... G06F 8/61; G06F 8/65
USPC .................. 717/169, 171, 173, 175, 176, 178
See application file for complete search history.

(56) References Cited

U.S. PATENT DOCUMENTS

| | | | | |
|---|---|---|---|---|
| 6,968,551 B2 * | 11/2005 | Hediger et al. | ............... | 717/174 |
| 7,877,461 B1 * | 1/2011 | Rimmer | ........................ | 709/217 |
| 8,108,853 B2 * | 1/2012 | Bale et al. | ..................... | 717/174 |
| 2003/0097433 A1 * | 5/2003 | Park et al. | ..................... | 709/222 |
| 2003/0147369 A1 * | 8/2003 | Singh et al. | ................... | 370/338 |
| 2004/0268124 A1 | 12/2004 | Narayanan et al. | | |
| 2006/0130054 A1 | 6/2006 | Bocking et al. | | |
| 2009/0183151 A1 * | 7/2009 | Gharabally et al. | .......... | 717/178 |
| 2010/0174834 A1 * | 7/2010 | Lowe et al. | ..................... | 710/14 |
| 2011/0010759 A1 | 1/2011 | Adler et al. | | |

* cited by examiner

*Primary Examiner* — Phillip H Nguyen
(74) *Attorney, Agent, or Firm* — Daniel Schein, Esq.

(57) ABSTRACT

A method for downloading a first application to a target system through a host system consisting of downloading a first application adapted to run on a host system from a program store to a host system, and subsequently downloading a second application adapted to run on a target system from the host system to the target system. The first application and the second application enable the host system and the target system to exchange information.

19 Claims, 9 Drawing Sheets

PROGRAM STORE FOR UPDATING ELECTRONIC DEVICES

FIELD OF THE INVENTION

The invention pertains generally to downloading a program and/or key from a program/key store location to an electronic device.

BACKGROUND OF THE INVENTION

Modern computing devices, such as computers, mobile computing devices, and mobile phones, are capable of downloading and installing a wide variety of software applications. For example, software sources, such as Apple's App Store, allow users to browse and download applications onto their computing devices. For example, Apple's App Store and others like it allow users to download various applications to their mobile devices, such as their mobile phone. Currently, there are an extremely large number of applications available through sources like the App Store.

Users of specialized electronic devices, however, have different requirements regarding updating firmware and programs on these devices after these devices are in client hands. Constraints on electronic devices and security concerns necessitate a new logic for updating.

Thus there is a need for a robust method for updating electronic devices through program/key stores. There is a need for a robust method for updating electronic devices from App Stores in a generic and reliable way that preserves security, reduces deployment and maintenance costs and adheres to standards.

SUMMARY OF INVENTION

A method of access to a set of entities for download to a host system and to a target system, wherein said target system is mobile and has a size less than 25 cm3; wherein said target system does not have an LCD larger than 3 cm2; wherein said target system memory size is less than 10 MB; wherein said target system comprises at least one loader program; wherein the loader program comprises at least one public key; wherein the target system does not have an interface operable by a user for resetting said target system; wherein the target system does not have an interface operable by a user for setting said target system to upgrade mode; the method comprising: storing a plurality of entities at a program store location; upon a user accessing said program store location, displaying a set of eligible listings based on said user profile; wherein each listing is associated with at least one set of entities for download; wherein upon a user selecting at least one listing via a front-end interface; obtaining user data from the user; connecting the program store location and the host system using a communication network; connecting the host system and said target system using a communication channel; downloading at least one first set of entities associated with said listing and at least one second entity comprising information corresponding to said user and associated with said listing to said host system; downloading said at least one second entity from said host system to said target system, wherein said at least one first set of entities is adapted to run on said host system; wherein said at least one second entity is adapted to run on said target system; wherein said at least one first set of entities is adapted to exchange information with said at least one second entity.

A method of access to a set of entities for download to a host system and to a target system, wherein said target system is mobile and has a size less than 25 cm3; wherein said target system does not have an LCD larger than 3 cm2; wherein said target system memory size is less than 10 MB; wherein said target system comprises at least one loader program; wherein the loader program comprises at least one public key; wherein the target system does not have an interface operable by a user for resetting said target system; wherein the target system does not have an interface operable by a user for setting said target system to upgrade mode; the method comprising: storing a plurality of entities at a program store location; upon a user accessing said program store location, displaying a set of eligible listings based on said user profile; wherein each listing is associated with at least one set of entities for download; wherein upon a user selecting at least one listing via a front-end interface; obtaining user data from the user; connecting the program store location and the host system using a communication network; connecting the host system and said target system using a communication channel; downloading at least one first set of entities associated with said listing and at least one second entity comprising information corresponding to said user and associated with said listing to said host system; downloading said at least one second entity from said host system to said target system, wherein said at least one first set of entities is adapted to run on said host system; wherein said at least one second entity is adapted to run on said target system; wherein said at least one first set of entities is adapted to exchange information with said at least one second entity.

A method of configuring access to an interface using a target system and a program store, wherein said target system is mobile and has a size less than 25 cm3; wherein said target system comprises at least one loader program; wherein said loader program comprises at least one public key; wherein said program store stores at least one entity for download at a program store location; the method comprising: upon a user accessing said program store, displaying a set of eligible access interfaces based on user privileges; wherein each access interface is associated with at least one set of entities for download; wherein upon a user selecting at least one access interface via a front-end interface; obtaining user data from the user; connecting the program store location to said user's host system using a communication network; connecting said user's host system and said target system using a communication channel; preparing a first set of entities corresponding to said at least one access interface for download to said host system, wherein said first set of entities is adapted to run on said host system, preparing a second set of entities corresponding to said at least one access interface for download to a target system, wherein said second set of entities comprises user information, wherein said second set of entities is adapted to run on said target system, downloading said first set of entities and said second set of entities to said host system; downloading said second set of entities from said host system to said target system; wherein said first set of entities is adapted to exchange information with said second set of entities.

BRIEF DESCRIPTION OF THE DRAWINGS

The present invention with be more clearly understood after reference to the following detailed specifications read in conjunction with the drawings wherein.

Similar reference numerals are used in different figures to denote similar components.

DETAILED DESCRIPTION OF THE PREFERRED EMBODIMENTS

Figure 1:
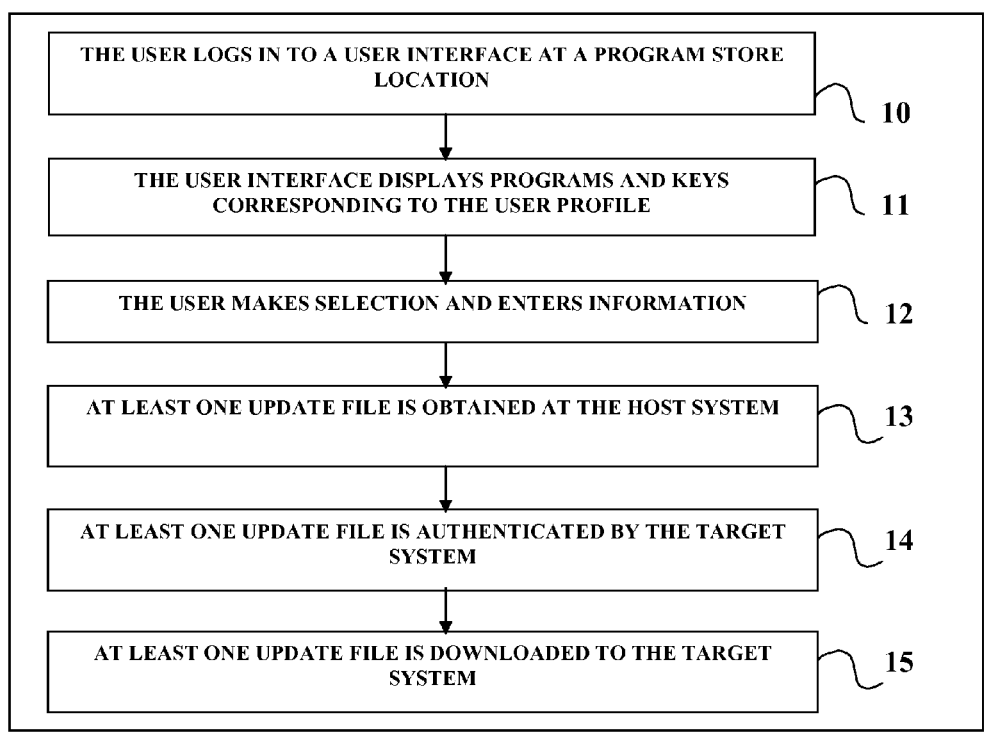
FIG. 1 is a flowchart illustrating the steps for selecting a program and/or key for download from a program/key store location to a host system and to a target system

As employed herein, the term "host system" shall expressly include, but not be limited by, a workstation, a personal computer, a desktop system, a server, and a wide range of devices or destinations for receiving a downloaded program from a program/key store location.

As employed herein, the term "target system" shall expressly include, but not be limited by, a mobile electronic device, a wireless electronic device, and a wide range of devices or destinations for receiving a downloaded program from a host system.

As employed herein, the term "program/key store location" shall expressly include, but not be limited by, a workstation, a personal computer, a server, an HTTP server, a web server, a central program/key store location, a shared network location, and a wide range of sources for downloading or enabling download of a program and/or key to a host system. The central program/key store location may include a disk sub-system storing a plurality of programs and/or keys.

The Program/key store location may be a website or service, which allows users of to browse and download programs and/or keys.

The Program/key store location may be a data store that stores entities such as firmware, applications, programs, digital keys, configuration files, and Application Programming Interfaces (API).

As employed herein, the term "communication network" shall expressly include, but not be limited by, a wide area network (WAN), a local area network (LAN), a personal area network (PAN), a wireless network (e.g., without limitation, WWAN; WLAN; WPAN; a wireless metropolitan area network (WMAN)), a data service (GPRS, SMS, email), an intranet, an extranet, a global communication network, and/or the Internet.

As employed herein, the term "communication channel" shall expressly include, but not be limited by, a communication network, a USB cable link, an RS232 cable link, a point-to-point communication link, an infrared link, a short wireless transceiver link (BLUETOOTH, NFC, ANT, WIBREE) and a wide range of communication mechanisms between a host system and a target system.

BLUETOOTH technology permits a BLUETOOTH enabled device to open a wireless connection with other Bluetooth devices that are within a 10-meter range (for example, a hands-free car kit or wireless headset).

A BLUETOOTH profile on a host system specifies how applications can connect and run.

BLUETOOTH Serial Port Profile on a host system specifies how the host system can open a serial connection to another BLUETOOTH enabled device using a virtual serial port.

In a preferred embodiment, the user places the electronic device in an interface cradle that is electrically connected to the computer through a suitable communication channel.

The invention is disclosed in connection with downloading or enabling download of a program or key from a central program/key store location to a personal computer and, then, to a wireless electronic device, although the invention is applicable to downloading or enabling download of a program or key from a wide range of program/key store locations to a wide range of destination systems, such as a wide range of host systems and a wide range of target systems.

Referring to FIG. 1, a flowchart illustrating the steps for selecting a program and/or key for download from a program/key store location to a host system and to a target system. A login screen may be used to enter authentication parameters and gain access to the application in step 10.

Upon user authentication, a list of listings is displayed based on the user profile and access privileges in step 11. Each of the listings has associated programs and keys available for download to the user's device.

A plurality of programs and keys are stored at the program/key store location. A plurality of program identifiers (e.g., ID1; ID2; ID3) are stored at the program/key store location, with each of at least some of the program identifiers being associated with one or more of the programs.

A version number (e.g., VN1; VN2; VN3) may also be associated with each of the programs.

The program/key store location and the host system are connected by a communication network. The host system and the target system are connected via a communication channel.

In an alternative embodiment, a device identifier is sent from the target system to the host system over the communication channel. The device identifier may be sent to the program/key store location and may be employed in order to authorize a download or to select one of the at least one of the programs or keys, and to download the program or key from the program/key store location to the host system and/or from the host system to the target system.

In step 12, the user makes a selection among the available choices. The user may be prompted to enter some information such as user PIN code, user data, user file, user preferences. Alternatively, the user may be asked to perform actions, for example, the user may be given a PIN code, and may be asked to pair his/her target system to a host system using the PIN code.

In step 13, at least one update file is installed on the host system. The update file may be generated by the program store location or may be just downloaded from the program store location.

The at least one update file can be one or more files that can be installed to the target system.

In another embodiment, the at least one update file is an application that is downloaded to the host system, and that when run, can connect to the target system and can download an update file to the target system.

In another embodiment, the at least one update file comprise an application that runs on the host system, and a download file that can be installed to the target system.

In another embodiment, the at least one update file comprise an Application Programming Interface (API) that can be included in an application that runs on the host system, and a download file that can be installed to the target system. In step 14, at least one update file is authenticated by the target system, and the private key is checked against the public key stored in the target system. If a match is found, the at least one update file is downloaded to the target system in step 15.

Alternatively, it is possible that no program might be found that meets the requirements of the device identifier and, hence, no selection is made.

Finally, the selected program and/or key are downloaded from the host system to the target system. In an alternative embodiment, the selected program and/or key is flashed to the target system.

Figure 2:
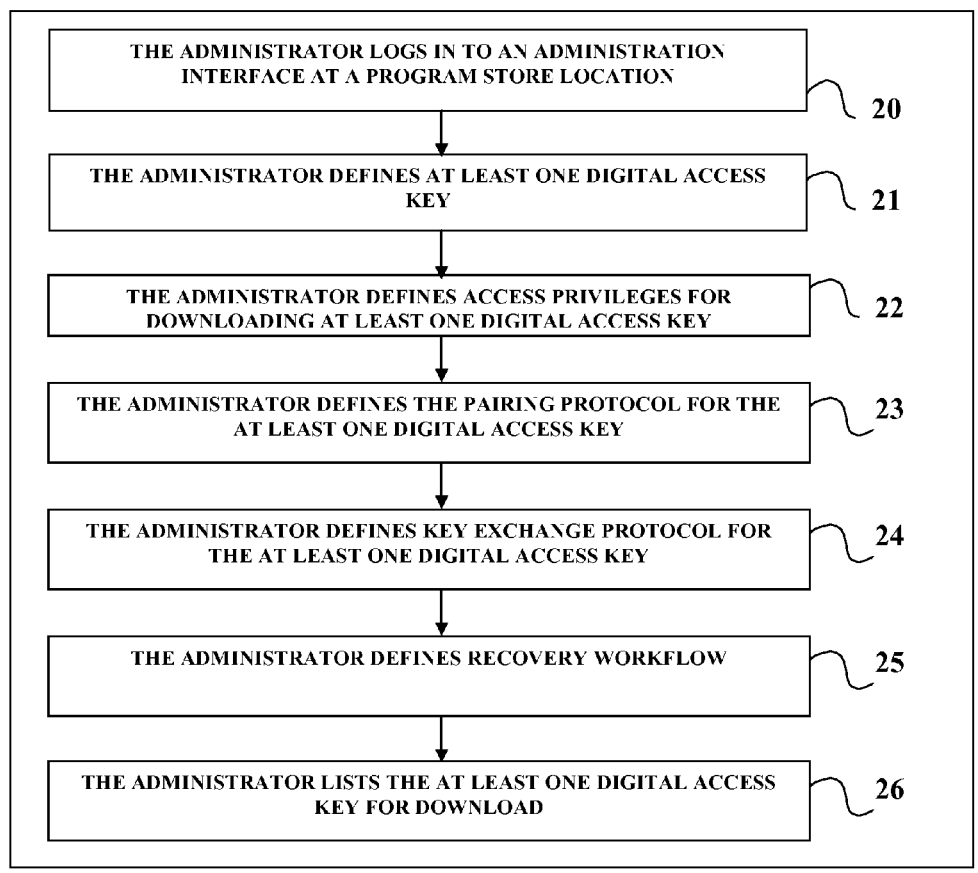
FIG. 2 is a flowchart for listing a key for download.

FIG. 2 is a flowchart for listing a key for download.

The system includes the program/key store location, the host system, the target system, a communication network connecting the program/key store location and the host system, a communication channel connecting the host system and the target system, a loader routine adapted to execute at the host system, and a second device loader routine adapted to execute at the target system.

The program/key store location includes a memory storing a plurality of programs and keys, with possibly a version number preferably being associated with each of the programs. The memory also stores a plurality of identifiers, with each of at least some of the identifiers being associated with one or more of the programs and/or key. The target system includes an identifier.

The loader routine may be stored and downloaded to the host system from the program/key store location over the communication network, is adapted to execute at the host system, communicate with the program/key store location through the communication network, communicate with the target system through the communication channel.

In an alternative embodiment, the loader routine is a JAVA routine that is downloaded from a server over the internet or intranet. The loader routine can execute and run in a browser.

In an alternative embodiment, the loader routine can receive information from the target system over the communication channel, such as: a device identifier, a version number, manufacturer ID, vendor ID, hardware ID (such as BLUETOOTH ID, WIBREE ID, NFC ID), profile ID, protocol ID, device type, class of device, device name, transmission power, digital keys, digital signatures, authorization data, user identifier data, and other information.

The loader routine can also change, update and store this information on the target system through USB, SPI or UART connection.

In another preferred embodiment, the loader routine can employ the program identifiers from the program/key store location and the received device identifier to select one of the one or more programs, such as program and/or key, for download as a selected program from the program/key store location to the host system, and download the selected program from the host system to the target system.

The second device loader routine is installed at factory (or on chip) on the target system and cannot be modified by the user or changed through a USB port, an RS232 port or a readily accessible programming port. The second device loader routine check the signatures of downloads and rejects the download if the signature does not match a private or public key.

In step 20, the system administrator logs in to an administration interface at a program/key store location.

In step 21, the system administrator defines at least one digital access key.

In step 22, the system administrator may define the user access privileges for downloading at least one digital access key. For example, the system administrator may define specific users, or specific user groups that can have access to the at least one digital access key.

In step 23, the system administrator may define the pairing protocol for the at least one digital access key. For example, the system administrator may define restrictions on the device that can be paired with the target system, the system administrator may define the maximum period of time for pairing, the system administrator may define the number of devices that may be paired with the target system, or any other pairing rules.

In a preferred embodiment, after the pairing completes according to the protocol and rules, the target system changes to non-discoverable.

It is understood that the target system cannot be set to discoverable unless it receives a new download file with a program that sets it to discoverable.

In step 24, the system administrator may define the key exchange protocol for the at least one digital access key. For example, the system administrator may define a challenge and response protocol, or an encryption method/protocol for exchanging information.

In step 25, the system administrator may define a recovery workflow in case a target system needs replacement. An example of a recovery workflow is:
1) un-pair the old target system from the host system,
2) send a new target system to the client,
3) obtain a backup of the old target system from a database,
4) Write the backup of the old target system to the new target system.

In step 26, the system administrator defines a name for the key, and lists the key for download.

Figure 3:
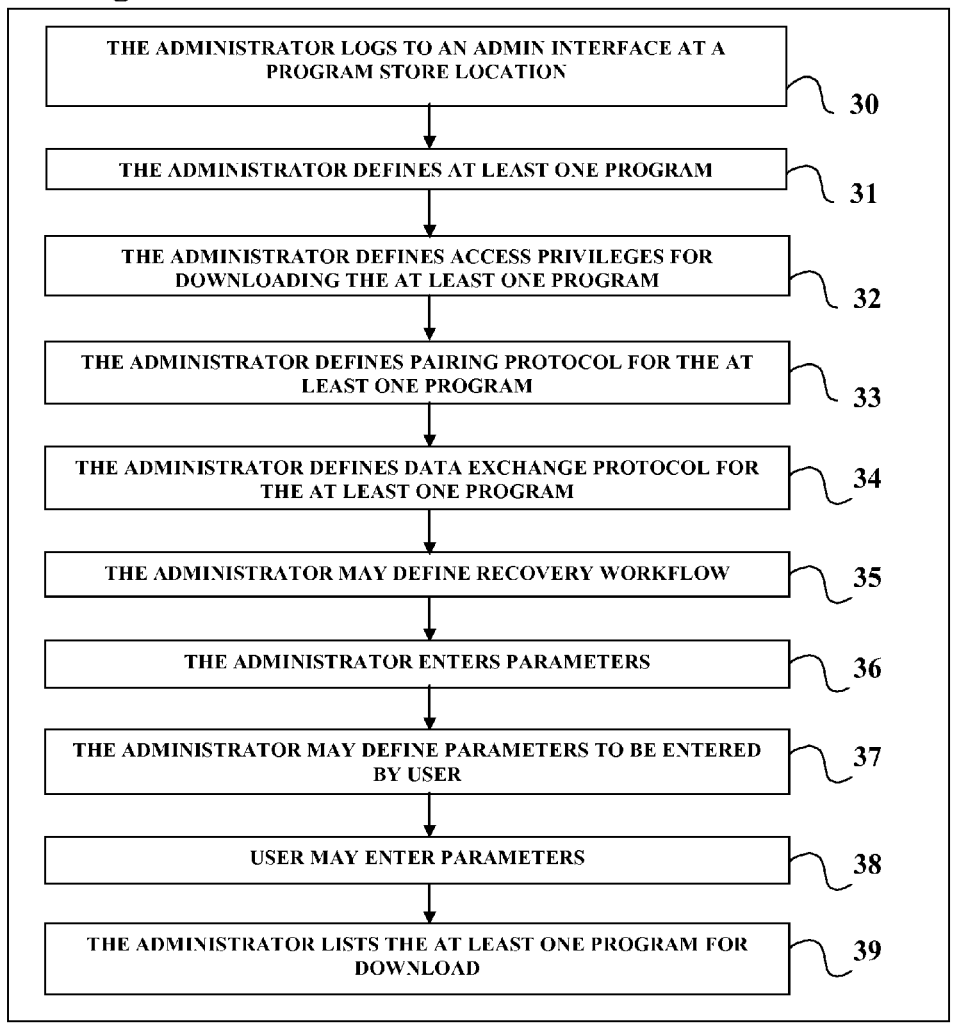
FIG. 3 is a flowchart for listing a program for download.

FIG. 3 is a flowchart for listing a program for download.

In step 30, the system administrator logs in to an administration interface at a program/key store location.

In step 31, the system administrator defines at least one program.

In step 32, the system administrator may define the user access privileges for downloading at least one program.

In step 33, the system administrator may define the pairing protocol for the at least one program. In a preferred embodiment, after the pairing completes according to the protocol and rules, the target system changes to non-discoverable.

In step 34, the system administrator may define the data exchange protocol for the at least one program.

In step 35, the system administrator may define a recovery workflow in case a target system needs replacement.

In step 36, the system administrator may enter parameters such as program name, listing name, as well as features for the target system, for example:

Is voice functionality enabled or not,

Is voice encryption enabled or not is proximity alarm enabled or not,

Is intelligent login enabled or not,

Is user PIN required or not,

Period of time before the user has to re-enter the PIN,

Number of invalid PIN entry before the system locks.

In step 37, the system administrator may determine parameters that the end user will be required to supply. For example, the end user may be required to supply a PIN code, or other user information.

In step 38, the end user is requested to enter parameters. This may be through a workflow, or through an application that is downloaded to the host system and that runs on the host system.

In step 39, the system administrator lists the at least one program for download.

Figure 4:
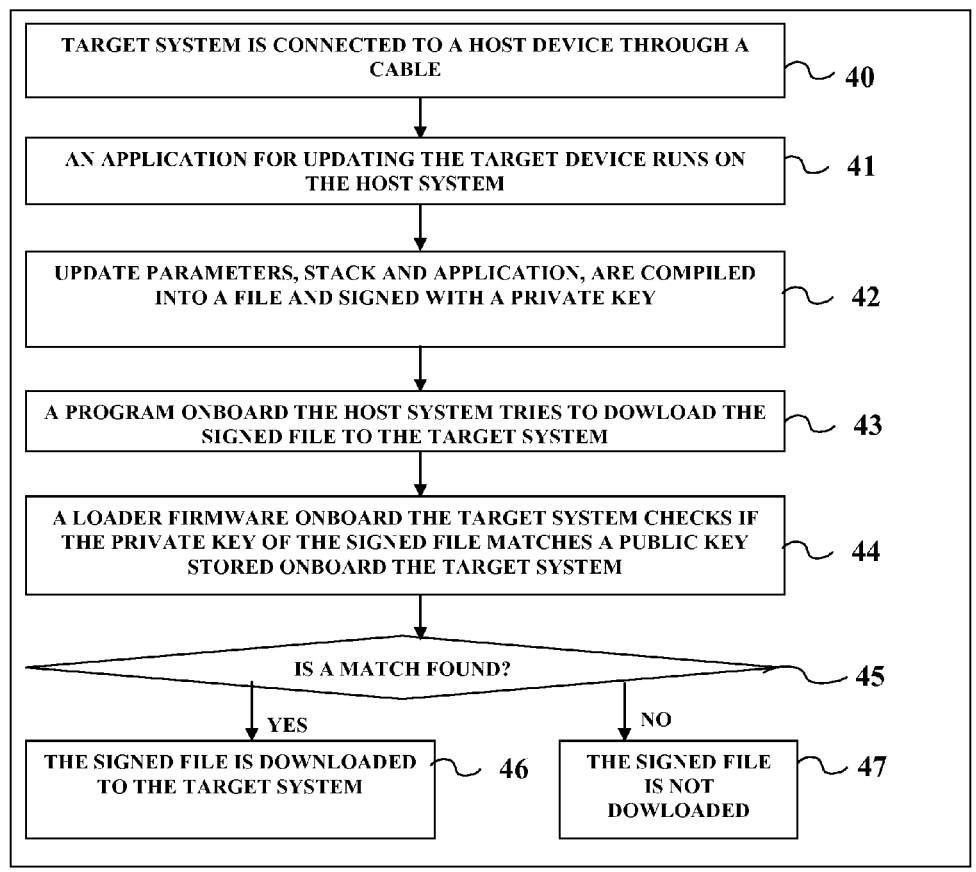
FIG. 4 is a flowchart for updating the target system.

Turning to FIG. 4, the flowchart illustrates updating the target system. In step 40, the target system is connected to a host system through a communication channel. In step 41, the user runs an application to update the target system. The application can be a program running on the computer, a web service, a web plug-in, or any software running on a specialized device.

In step 42, the application collects update parameters, stack and application, and prepares update files.

In step 43, the application tries to download the signed file to the target system.

In step 44, a resident loader firmware onboard the target system checks if the private key of the signed file matches a public key stored onboard the system or device (on insider the loader).

In step 45, if there is a match, the signed file is downloaded to the target system in step 46. When the new firmware executes, it may set the target system to discoverable to enable pairing with a new second device.

In step 47, the signed file is not downloaded.

In step 42, in a preferred embodiment, the application builds a DFU (device firmware upgrade) file using a DFU build tools. The application can sign the update files using a private key matching a public key stored on the target system. It is noted that the second device loader firmware routine adapted to execute at the target system cannot be updated through the communication channel, through a data port, through DFU (Device Firmware Upgrade), through a cable or through a wireless link. It can only be updated through access to PCB pins or PCB test points, such as SPI interface, JTAG interface, and R232 interface. This is so that the firmware onboard the target system cannot be tempered.

Figure 5:
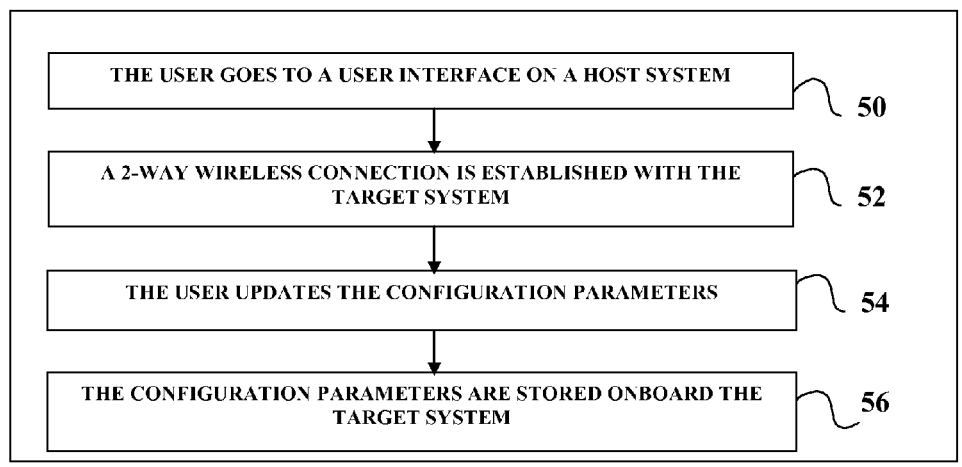
FIG. 5 is a flowchart for wireless configuration.

Turning now to FIG. 5, the flowchart illustrates configuring the target system wirelessly.

In step 50, the user goes to a user interface onboard a host system equipped with a short wireless transceiver. The user interface is installed from the In step 52, a two-way wireless connection is established between the target system and the host system.

In step 54, the user enters configuration parameters and files in the user interface and commands the user interface to update the target system.

In step 56, the configuration parameters are stored onboard the target system.

Figure 6:
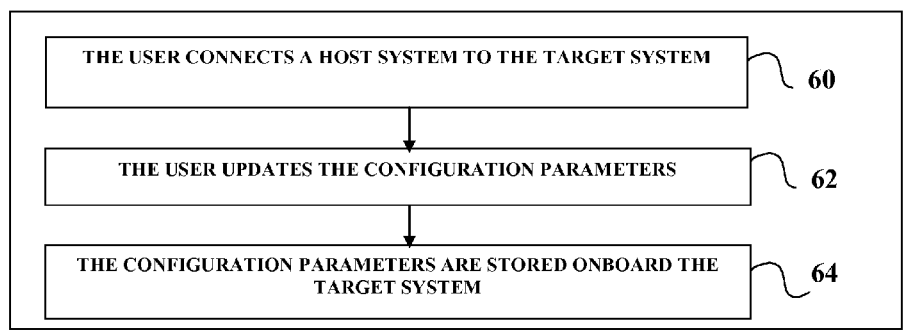
FIG. 6 is a flowchart for USB configuration.

Turning now to FIG. 6, the flowchart illustrates configuring the target system through USB.

In step 60, the user connects the target system to a host system such as a mobile phone, a computer or an electronic device equipped with USB.

In step 62, the user enters configuration parameters and files in a user interface and commands the user interface to update the target system.

The user interface allows the user to set configuration parameters or to change them. It may also display old configuration parameters.

Configuration parameters may include device identifier, a version number, manufacturer ID, vendor ID, hardware ID, profile ID, protocol ID, device type, class of device, device name, transmission power, digital keys, data thresholds such as acceptable temperature, acceptable blood pressure, acceptable heart rate, acceptable insulin level, acceptable pulse, operation hours, operation days, alert messages, recordings, client name, greetings, health conditions, blood type, medications, buzzer type, buzzer volume, buzzer duration, alarm type, pairing window duration before changing to non-discoverable, number of device pairings before changing to non-discoverable. The configuration parameters are stored onboard the target system.

The target system can share de secure key with the host system. The target system can delete the secure key when the target system disconnects from the host system and/or the disconnection timeout period expires.

The user interface program can be installed onboard the host system from the target system, from a CD, or from other medium such as Internet.

In step 64, the configuration parameters are stored onboard the target system.

Figure 7:
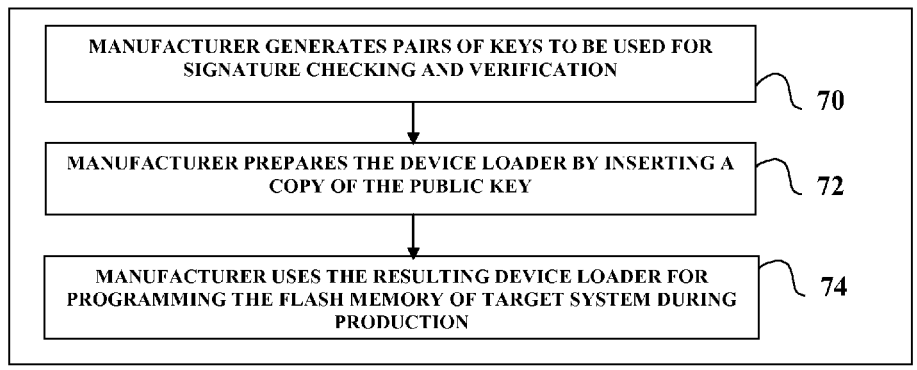
FIG. 7 is a flowchart for updating the target system.

Turning now to FIG. 7, the flowchart illustrates configuring the target system during production, and describes the sequence of command invocation. In step 70, the manufacturer generates one or more pairs of keys to be used for signature checking and verification.

In another preferred embodiment, the manufacturer generates up to two pairs of keys for signature checking and verification.

In step 72, the manufacturer prepares the device loader by inserting a copy of the public key. The copy of the public key may be a copy of the public stack key. The resulting loader files can be used for programming the flash memory during production in step 74.

In a preferred embodiment, the pair of keys is optional; if they are omitted then the corresponding signatures are never checked.

In step 70, in a preferred embodiment, software for upgrade via DFU is required to prepare a release of software for upgrade via DFU. This includes among others device loader software and unsigned stack software.

The command invocation may comprise values for a vendor ID, a product ID, a hardware ID, a device ID, a version number, a manufacturer ID, a profile ID, a protocol ID, a device type, a class of device, a device name, a transmission power, digital keys.

The keys can be used for DFU signature checking and verification.

In an embodiment, the device loader cannot be replaced via DFU.

It is noted that the second device loader firmware routine adapted to execute at the target system cannot be updated through the communication channel, through a data port, through DFU (Device Firmware Upgrade), through a cable or through a wireless link. It can only be updated through access to PCB pins or PCB test points, such as SPI interface, JTAG interface, and R232 interface. This is so that the firmware onboard the target system cannot be tempered.

Figure 8:
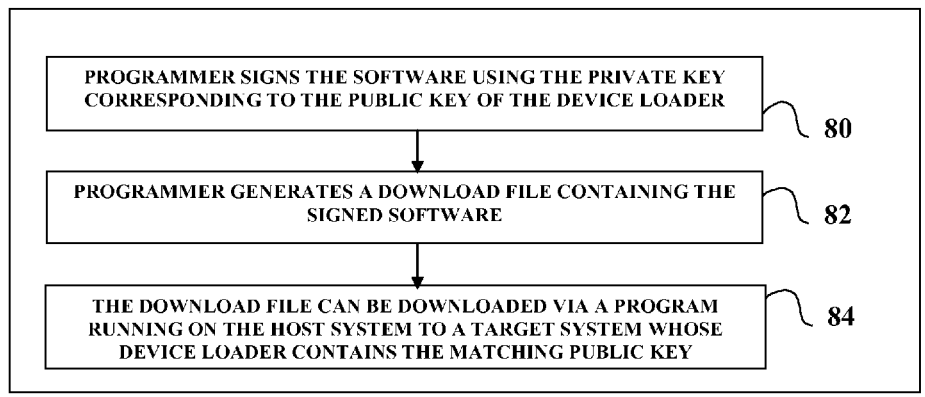
FIG. 8 is an alternative flowchart for updating the target system.

Turning now to FIG. 8, the flowchart illustrates configuring the target system.

In step 80, the programmer (or IT person, or system administrator) signs the program or stack software using the private stack key (corresponding to the public stack key used in step 72).

In step 82, the programmer generates a download file containing the signed stack software.

In another embodiment, the download file may comprise a software, application, firmware, digital keys and user information.

In another embodiment, the download file is an Application Programming Interface (API) providing functions selected from the group:

Automatic login:
  This function allows a host system to get login parameters automatically from a target system (and may get PIN code from the user), and to login automatically to an application, program or a service.

Intelligent login:
  This function allows a host system to get login parameters automatically from a target system, to get a PIN code from a user, and to login automatically to an application, program or a service.

If the user requests a second login after a period of time T1, the API checks if a signal drop between the host system and the target system was detected. If a signal drop was not detected, the host system compares T1 to a pre-determined PIN timeout time period T0 entered by the system administrator.

If T1<T0, the second login is authorized without the user entering the PIN code again.

If T1>T0, the user is requested to enter the PIN code again.

Generation of at least one function code (or at least one function code and at least one random number) to be transmitted to said target system:

This function allows the host system to send codes for obfuscation functions together with random numbers to the target device, where the codes for obfuscation function correspond to obfuscation functions stored onboard the target device. On receipt of a response from the target device, the host device applies a reverse obfuscation function corresponding to the code for obfuscation to retrieve the data sent by the target system.

Example:
API or program sends <CODE1> <Random number>
Target system applies obfuscation function F1 corresponding to <CODE1> to encrypt information I and to obtain encrypted information E
Target system sends encrypted information E to the host system
API or program applies ReverseF1(E) to obtain I Collection of statistics from said target system:
This function allows the host system to collect statistics from the target system. For example, the number of requests received, the number of successful responses to a host system, the number of unsuccessful responses to a host system, the number of interrupted sessions, etc.

Monitoring BLUETOOTH signal,
This function allows the host system to monitor a BLUETOOTH connection to a target system, and on detection of signal drop, to perform actions such as lock access, inform a server, etc.

Encrypting data,
This function allows the host system to encrypt data, or to use a key obtained from the target system to encrypt the data.

Decoding data,
This function allows the host system to decrypt data, or to use a key obtained from the target system to decrypt the data.

Erasing data.
This function allows the target system to erase data on detection of events.
For example, on detection of a sensor signal (or a switch) indicating tempering with the enclosure of the target system, the target system may erase its data.

In step 84, the download file or program can be downloaded via a program running on the host system to a target system whose device loader device loader contains the matching public key. This code signing helps prevent a user from loading unauthorized code onto the target system.

In step 82, in another embodiment, the most common type of DFU file that needs to be produced is one containing just the stack software for a single microprocessor variant. This requires at least two steps.

In another embodiment, the most common type of DFU file that needs to be produced is one containing just the stack software for a single BlueCore variant. BlueCore is a trademark of CSR (Cambridge Silicon Radio, leader in short wireless transceivers). (BlueCore: means the CSR family of single chip CMOS based Bluetooth® solutions which integrate onto one chipset the radio frequency (RF), baseband and communications protocol stacks). This requires at least two steps.

Figure 9:
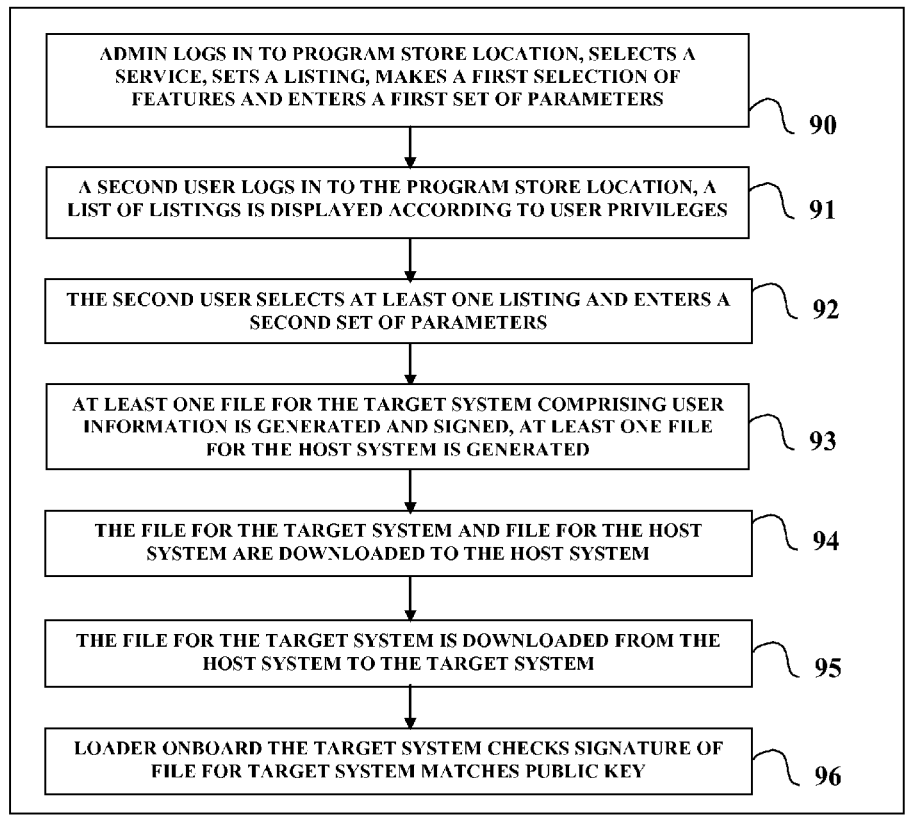
FIG. 9 is a flowchart illustrating configuration of a program for download to a target system.

The two steps are as follows:
1) Sign the stack software using the private stack key
2) Generate a download file or a DFU file containing the signed stack software Turning now to FIG. 9, the flowchart illustrates configuration of a program for download to a target system.

In step 90, a system administrator or IT person goes through a workflow that runs on a program/key program location and selects a service and associated set of first features and enters a corresponding first set of parameters.

The workflow can be any type of user interface, and can be a wizard, a workflow, an application, a program or a web interface.

The programmer selects a listing name for display corresponding to the selected service, and defines the user profiles that have privilege to access/view the listing and download entities associated with the listing.

The features can be:
Feature: Voice encryption enabled or disabled
Parameter from programmer: Algorithm for voice encryption is selected
Parameter from programmer: Data for voice encryption is entered
Feature: Data encryption enabled or disabled,
Parameter from programmer: Algorithm for data encryption is selected
Parameter from programmer: Data for data encryption is entered
Parameter from programmer: encryption functions and corresponding function codes and decryption functions
Parameter from user: disk encrypt enables or not
Parameter from user: file by file decrypt enables or not
Parameter from user: screen by screen decrypt enables or not
Feature: Intelligent login enabled or disabled
Parameter from programmer: period of time before PIN must be re-entered
Parameter from the user: User PIN code
Parameter from the user: User username
Parameter from the user: User password
Feature: Login enabled or disabled,
Parameter for the user: User PIN code is entered
Feature: Lock access enabled or disabled,
Parameter from the programmer: lock parameters according to company policy,
Parameter from the user: lock parameters,
Feature: Single sign on enabled or disabled,
Feature: Digital key enabled or disabled,
Parameter from the programmer: digital data,
Parameter from the user: User may enter digital data,
Feature: Proximity lock/unlock enabled or disabled
Feature: Proximity alarm enabled or disabled
Feature: Payment enabled or disabled,
Parameter from the programmer: user parameters, amount limits and user information,
Feature: NFC authorization enabled or disabled,
Parameter from the programmer: user parameters, amount limits and user information,
Parameter from the user: user name, password, PIN Feature: Text to speech enabled or disabled,
Feature: Device scanning enabled or disabled,
Feature: Keypad interface enabled or disabled,
Feature: Micro-display interface enabled or disabled,
Feature: Sensor data processing enabled or disabled,
Feature: Tracking enabled or disabled,
Feature: Parked vehicle locator enabled or disabled,
Feature: Dating application,
Feature: Pairing restrictions and timeouts
    Parameter from the programmer: user parameters
    Parameter from the user: User may enter user parameters
Feature: User code
    Parameter from the programmer: program routine
Feature: User access parameters
    Parameter from programmer: user accounts and user privileges The parameters can be any user parameter or program parameter required as input from the user after selecting a feature. The parameters are also required for generating a second workflow for capturing user features and parameters. When the programmer selects a specific feature, a workflow may be triggered that allows the programmer to enter parameters for the feature.

In a preferred embodiment, the system administrator may obtain a service template from the manufacturer of the program store or from the manufacturer of the target system, and may import it in the program store. The service template will install the new service in the program store.

The programmer of the service template provided by the program store or from the manufacturer of the target system generally may define the name of the service, the owner, the access rules, the pairing rules, the discoverable rules, the encryption rules.

The programmer may define the features that may be accessible to the end user, for example, is the target system going to have voice function, proximity alarm function or intelligent login function.

The programmer may define hardware tempering rules, for example, if a sensor detects that the hardware has been tempered, the target system will erase all its data, or will trigger an alarm.

The programmer may define driver lock rules so that if the driver has been tempered with, the program or API will lock, or the number of unsuccessful user entered wrong PIN codes before the program or API will lock.

The programmer defines the firmware to be downloaded to the target system. Alternatively, the programmer may define parts of firmware to be used to in combination with other system administrator or user supplied information to generate a firmware for download to the target system.

The programmer defines the user application to be downloaded by the end user, or the API to be generated. It is understood that that API will be used by third party programmers who will use the API to generate applications, programs or other APIs that can communicate with the target system.

The programmer may define recovery rules, for example:
    The programmer may set the program store to store a copy of the last download file
    In case of target system loss, the program store can automatically remove pairing to the old target system,
    In case of a target system loss, the program store may dispatch a new target system and may enable the download of the copy of the last download file to the new target system.

The programmer may define statistics rules so that every time the target system is connected, some statistics are extracted from it, and stored. These statistics may include the number of connection to a host system, the number of requests received, the number of failed connections and others.

The programmer may also define the parameters that the system administrator will enter, and those that the end user will enter.

The system administrator can define a new service selected from the service template; define the parameters for the new service.

The system administrator can define the display name for the service, define who can have access to the service, or download the keys or programs.

The system administrator can define pairing parameters, encryption parameters, recovery parameters, features available to the end user (from the features made available by the programmer).

The system administrator my update the API parameters, for example, he may set the number of unsuccessful PINs to a number.

The system administrator also enters the keys and the information to be stored on the target system.

The end users of the program store can define user parameters (such as PIN code, user data . . . ), install application or API on the host system, and update the firmware on the target system.

The admin can also set the following parameters:
    User access privileges for accessing said listing,
    Name of device that can be paired with the target system,
    Class of service of device that can be paired with the target system,
    BLUETOOTH ID range of the target system,
    Maximum number of devices that can be paired with the target system before the target system becomes non discoverable,
    Pairing window duration before the target system becomes non discoverable,
    User name, password, seed, algorithm, operation codes, PKI,
    Firmware file, application file, API file, configuration data file,
    Security protocols,
    Encryption protocols,
    Key generation protocols from among a list of key generation protocols,
    Voice enabled/disabled,
    Voice encryption enabled/disabled,
    Proximity alarm function enabled/disabled,
    Intelligent login function enabled/disabled,
    Erase data on detection of hardware tempering enabled/disabled,
    Lock after a predetermined number of incorrect PIN code enabled/disabled,
    Lock after a predetermined number of incorrect response from said target system enabled/disabled,
    Backup of target system enabled/disabled,
    Collect statistics from said target system enabled/disabled,
    Operating System for said host system.

In step 91, a second user logs in to the program store location and a list of listings comprising services, programs or keys is displayed according to the user privileges. If the user profile corresponds to a profile that has privilege to access/view the listing and download entities associated with the listing, then the listing is displayed to the user, and is accessible to the user. In a preferred embodiment, the system administrator defines user profiles, user group and user privileges or group privileges or imports them from another system, or integrated the program store with another system containing user information.

In step 92, the second user can select at least one listing from among the listings available for the second user.

In another embodiment, the program store generates a second workflow dynamically and automatically based on the service, features, parameters and programs entered by the admin.

The second workflow can run on the host system or from the program/key store location. It can also include a loader that runs on the host system and that can load a firmware onto the target system.

For example, a program implements an intelligent login feature for a CRM application, and makes it available to people from the marketing departments. The programmer defines parameters such as PIN code is valid for 2 hours, and PIN code is not valid after a connection drop.

A second workflow is generated automatically.

When a user accesses the second workflow, the second workflow checks if the user is from the marketing department, and if so, the user will be able to download the intelligent login feature for the CRM application. If the user is not from the marketing department, the user will not be able to view the intelligent login for the CRM application. Alternatively, the intelligent login for the CRM application is disabled.

The second workflow will ask the user to enter a user name, password and PIN code.

In an alternative embodiment, the second workflow may provision some external system with the user information, for example, the second workflow may create a user account in an LDAP server.

In step 93, the second workflow generates at least one file comprising:

A file for the target system comprising user information (such as user account information, user PKI keys, user thresholds, user parameters, user privileges, user data, user PIN code), the file may comprise a program for performing the features and parameters of the service and a file for the host system.

The file for the target system is signed with a private key matching the public key contained in the target system.

In an embodiment, the file for the host system can be a configuration file.

In an embodiment, the second workflow combines the file for the target system and the file for the host system into on download file.

In step 94, the file for the target system and the file for the host system are downloaded to the host system.

In step 95, a loader onboard the host system downloads/flashes the file for the target system to the target system.

In step 96, a second loader onboard the target system checks if the signature of the file for the target system matches the public key contained in the target system. If a match is not found, the download is rejected.

In one embodiment, the file for the host system runs on the host system, it is capable of exchanging information with the file for the target system when the file for the target system runs on the target system.

In some preferred embodiments, target system includes a memory interface, one or more data processors, a central processing unit, and a short wireless transceiver comprising a radio frequency (RF) baseband and communications protocol stack.

In another preferred embodiment, the host device is configured as an access interface, and the target device is configured as a wireless key storage interface. Upon user requesting access, the host interface requests a PIN code from the user. Upon validation of the PIN code, the host device access interface requests user's access information from the target system.

Upon authentication of the user's access information, the access interface authorizes access.

In a preferred embodiment, the access interface can be:
  A door lock/unlock system,
  A motor start/stop system,
  A switch on/off system,
  A login interface.

In some preferred embodiments, target system includes a single BLUETOOTH short range wireless transceiver and consumes less than 100 mAh, emits less than 100 milliwatt and does not include a cellular transceiver or a long range transceiver (more than 100 meter in range).

In some preferred embodiments, target system includes at least one short range wireless transceiver.

In some preferred embodiment, target system includes a single short range wireless transceiver.

In some preferred embodiments, target system has not more than 16 Mega Bits or 32 Mega Bits or memory. In some preferred embodiments, target system has not more than 10 Mega Bytes of memory.

In some preferred embodiments, the target system is less than 25 centimeter cube. In some preferred embodiments, the target system is less than 15 centimeter cube. In some preferred embodiments, the target system is less than 150 centimeter cube.

The target system can include any of LEDs, a buzzer, a microphone, a speaker, a vibrator, a headset, a flip headset, a foldable headset, a twist headset, a push headset, a slid headset.

The target system may include sensor means such as GPS sensor, accelerometer, biometric sensors, etc. The target system may include a short wireless interface for interfacing to remote sensors such as GPS sensor, accelerometer, biometric sensors etc. The various components in the mobile device can be coupled by one or more communication buses or signal lines.

In a preferred embodiment, an attachment mechanism or system, including but not limited to a hook, harness, notebook security lock, insert, pin, clip, badge, clip, key chain, ring, tee, dog collar, Velcro, ring, fastening mechanism, sticky surface are optionally attached to the target system.

In a preferred embodiment, the target system does not include an LCD, OLED or touch screen, is less than 25 centimeter cube in volume, consumes less than 100 mA in current. The user uses a user interface onboard a host system or a wizard in order to make selections, and manage the download operation to the target system.

In a preferred embodiment, the target system does not include an LCD (Liquid Crystal Display) with a display larger than 3 CM2.

In a preferred embodiment, the target system does not include a reset function or button, or a reset interface operable by the user; this is to prevent re-use in case of loss or theft. If reset is needed, a system administrator may flash a new program file to the target system with a function to re-enable the pairing capability. This feature is important as it prevents anybody from hacking the device or learning how it functions, or what protocols it uses.

In a preferred embodiment, the target system may run a basic virtual machine to control utilisation of memory, transceiver and I/Os, or may have no virtual machine.

It is noted that in a preferred embodiment, the target system does not run a web server or an operating system such as Darwin, RTXC, LINUX, UNIX, OS X, WINDOWS, ANDROID, IOS, SYMBIAN, BLACKBERRY or an embedded operating system such as VxWorks.

It is noted that in a preferred embodiment, the target system has a DSP with less than 64-MIPS or a DSP with less than 500 MIPS.

The target system is no IP addressable.

In a preferred embodiment, the target system is differentiated from a computer or a smart phone device as being a specialized electronic devices and not computing devices or smart phone or computer or server. The target system does not allow a user to run applications and does not have features of a personal digital assistant or computers (send/receive email, edit documents). For example, a Smartphone runs a more open and complete mobile operating system than electronic devices.
A Smartphone is based on an operating system allows it to run applications. Apple's iPhone runs the iOS, Nokia phones run Microsoft Window Phone 7, other Nokia phones run Symbian, and BlackBerry Smartphone run the BlackBerry OS. Other devices run Google's Android OS, HP's webOS, and Microsoft's Windows Phone. Our target systems have specialized architectures and have different properties that OS-based systems.
BlackBerry OS, and embedded Linux distributions such as Maemo and MeeGo. Such systems can be installed on many different phone models, and typically each device can receive multiple OS software updates over its lifetime. Smartphones can run third-party applications using advanced application programming interfaces (APIs).

Thus a program/key download store location is necessary to cater to the needs of this emergent electronic device market with no OS.

Users of specialized electronic devices, however, have different requirements regarding updating/upgrading firmware and programs on these devices after these devices are in client hands. Constraints on electronic devices and security concerns necessitate a new logic for updating.

For example, the lack of display on these devices means that updating/upgrading firmware needs to starts from an external device. Also, these devices generally have very small memory, and hold a loader (for upgrade) and a program in memory.
These devices do not have a user interface for upgrade/update or for reset.
These devices cannot run more than one program simultaneously. For example, when the loader is running, they cannot run the firmware.
These devices cannot communicate or send data while being updated/upgraded. They cannot switch themselves to upgrade/update mode as that would provide a security hole where hackers can inject malicious software or un-licensed software. Also, they do not include an interface operable by the user for changing mode to upgrade mode.
These devices detect upgrades initiated by an external device using signaling. For example, they can detect upgrades using a loader according to Device Firmware Upgrade protocol, and they can automatically authenticate the private key on the upgrade, and authorize or reject the loading of the upgrade.

In some preferred embodiments, target system can be a wireless key device, a wireless health monitor wearable device, a wireless wearable micro-display viewer system, a wireless wearable keypad system, a motor interface, a lock, an actuator, a remote unitary sensor equipped with a short wireless transceiver.

In some preferred embodiment, a program can be a security program such as a lock/unlock program, a sign on program, a login program, a door access program, a single sign on program, a digital key management program, an encryption program, a voice encryption/decryption program, a proximity alarm program, or any other program such as a headset program, payment program, an NFC authorization program, voice recognition program, a text to speech program, a device scanning program, a keypad interface program, a micro-display interface program, a sensor data management program, a tracking program, a locator for parked vehicles, a lock access management system.

In some embodiments, in order to have its program or key installed on a host system, an entity, such as a carrier or enterprise, may send requests to a trusted authority. This request may specify types of access and functionality that the entity would like target systems to have while accessing a program/key store location. The trusted authority may create a download file, which reflects the entity's desired policies for those target systems.

In some embodiments, the Program/key store location may list software and/or hardware available for purchase or free of charge together with keys. The software and/or hardware are compatible with keys to be downloaded to a target system. The keys when used at the target system allow access to the software and/or hardware. An example is a lock and a digital key, which when loaded on a wireless access device, allows unlocking the lock. Another example is an application and a digital key, which when loaded on a wireless access device, allows access to the application using two factor authentication.

In some embodiments, Program/key store locations are front-end interfaces that may be implemented as storefronts with different appearances, such as color scheme and functions. In addition, a storefront may comprise various contents, devices and applications that are only available via the storefront. For example, applications specific to a particular enterprise may be offered via a particular storefront, but is otherwise withheld from other users of source.

In some embodiments, authorization functionality may be provided by, or in conjunction with, a loader firmware routine adapted to execute at the host system. The loader firmware routine determines whether the code has been authorized by a trusted authority. If the code is authorized and verified as such, it may be generally executed; if the code is not authorized, its ability to be downloaded to a target system may be prevented.
The host system may alert the user that the code is not authorized and ask the user if they still wish to execute the unauthorized code. In other embodiments, host system may be configured to prevent unauthorized code from being executed at all, regardless of the user's wishes.

In some embodiments, a trusted authority may authorize software by digitally signing the software. As is known in the art, a digital signature uses public key cryptography to ensure the integrity of data. For example, a software developer may provide trusted authority with compiled object code. Trusted authority may then create a digital signature with its private key to the object code and may make the code available to computing devices.

In some embodiments, the download program may be authenticated through the use of one or more digital signatures. For example, an entity can digitally sign one or more download program. A digital signature can use public key cryptography to ensure the integrity of data. The entity may provide source with compiled object code. That entity may then create a digital signature with its private key, which is included in the download program.

When a user requests access to a program/key store location, the program/key store location may check authorizations specified in the user profile to determine the manner in which a source of software can be accessed. Various front-end interfaces may essentially serve as "storefronts" that allow for a more customized or limited access to the programs and keys.

This allows various entities to customize how a user may access a program or key. For example, various front-end interfaces (or storefronts) may be customized to suit the requirements of a specific organization or business. Other front-end interfaces (or storefronts) may be customized to suit the needs of a particular vendor, or type of user, such as a people of different ages, ethnicity, location, or different interests. One skilled in the art will recognize that the embodiments are applicable to a wide variety of target systems, host systems and platforms and different programs and keys. Moreover, the front-end interfaces can provide a wide variety of customization for accessing a source of content and applications.

In some embodiments, a content management application can connect to the appropriate front-end interfaces or program/key store location. In particular, content management application may utilize the network connectivity to connect to program/key store location.

In some embodiments, once the target system is paired to a predetermined number of compatible devices, it becomes "non-discoverable". In some embodiments, once the target system is paired to a predetermined number of compatible devices, it becomes "non-discoverable".

In another preferred embodiment, the program/key store location application makes calls to a browser plug-in. The plug-in enables the browser to automatically install drivers if they are not previously installed (user authorization may be required). Furthermore, the plug-in enables the browser application to communicate with the target system and to send and receive data to/from it.

In a preferred embodiment, the user selects at least one program or key. An application loader at the program/key store location generates an installation file that combines the at least one program or key, signs the file, and makes it available for download to the user host system.

In another preferred embodiment, groupings of programs and keys are pre-prepared, pre-signed and made available for download.

In another preferred embodiment, the user selects individual programs and keys which are downloaded to the host system. A loader routine adapted to execute at the host system assembles the programs and keys into one file, signs the file and makes it available for download to the target system.

In another preferred embodiment, a loader routine can update keys on the target system.

In another embodiment, the user may access a remote web site from a host system in order to activate the tool/wizard at the host system. This permits the host system to complete the upgrade in an interactive fashion (e.g., where the user can make decisions) or in an automated scripted fashion (e.g., where the IT department, but not the user, can make decisions).

Alternatively, the process can be relatively advanced whereby the IT department defines a software configuration for electronic device software and then pushes such upgrades out from an enterprise server.

For example, the system administrator applies a "software configuration" to an electronic device. The user is then prompted to initiate the upgrade (or to defer it for a period of time). When the electronic device is connected to the host system and the upgrade is initiated, the electronic device authenticates the download information, the new software is downloaded to the electronic device and the device is triggered to perform the upgrade. The decision process is performed by a server.

A loader routine adapted to execute at the host system may ask information from the target system, and may send the information to the server. The server may send the program updates to the host system.

The IT department may provide users with a basic tool to upgrade or load software for their target system. For example, a lightweight loader tool/wizard may be run from the central program/key store location as specified by the IT department. The tool/wizard provides an easy way for system administrators to load electronic device software without requiring a full desktop manager to be installed on the user's computer.

The tool/wizard permits the user to configure various aspects of the program for download before it is installed onto the target system.

The tool/wizard permits the user to backup data of the device before a program is downloaded to the target system and stores the download data in a database.

In a preferred embodiment, when a user configures a target device, the tool/wizard obtains the BLUETOOTH ID from the target system. It then stores the download files and the BLUETOOTH ID in a database. This information will be readily accessible in case the user looses the target system, and would like to get a duplicate.

In another embodiment, the tool/wizard stored the download file and the user ID in a database.

In a preferred embodiment, on loss of a target system, the pairing between the host system and the lost target system is deleted so that the lost target system can no longer communicate with the host system. The last download file for the lost target system is retrieved from a storage system. The last download file is downloaded to a new target system.

In a preferred embodiment, the tool/wizard obtains device information from the target system, used the information to prepare a download file, and then downloads the download file to the target system.

In another preferred embodiment, the tool/wizard obtains device information from the target system, sends the information to the program/key store location which uses the device information to generate a download file.

In one preferred embodiment, the tool/wizard enables the user to configure the user interface and allows the user to set configuration parameters or to change them. It may also display old configuration parameters.

Configuration parameters may include device identifier, a version number, manufacturer ID, vendor ID, hardware ID, profile ID, protocol ID, device type, class of device, device name, transmission power, digital keys.

The configuration parameters may include login protocol (username/password, one time password), access authorization management, authentication protocol, encryption/obfuscation protocol, encryption/decryption functions, channel security definition, user data entry workflow, user authentication workflow, PIN/password timeout period, discoverable timeout period, challenge question response timeout period, number of allowed paired devices, acceptable devices for pairing, pairing window duration before changing to non-discoverable, period for connecting to server database, number of device pairings before changing to non-discoverable. The configuration parameters may include credit amount, credit limit, personal information, user information, biometric info.

The configuration parameters may include exception processing, failed PIN/login workflow, device not found workflow, buzzer type, buzzer volume, buzzer duration, alarm type.

The configuration parameters may include greeting messages, audio messages, voice recognition protocol, marketing file definition, alert messages, recordings, client name, greetings, operation hours, operation days.

The configuration parameters may include sleep mode management, power management, alarm management, NFC transaction authorization management. The configuration parameters may include data thresholds such as acceptable temperature, acceptable blood pressure, acceptable heart rate, acceptable insulin level, acceptable pulse, health conditions, blood type, and medications. The configuration parameters are stored onboard the target system.

The configuration parameters may include the operating system of the host system.

The wizard/tool generally generates code for the target system and code for the host system API or program for the host system.

In an embodiment, the program for the host system is an access interface, and the access interface is displayed to the user via a front-end interface assuming the user privileges allow that.

In an embodiment, the program for the host system is an access interface adapted to communicate over BLUETOOTH with a target system comprising a single BLUETOOTH transceiver system.

In one embodiment, at least one version of the program for the host system for at least one Operating System can be stored in the program/key store.

An associated firmware adapted to run on the target system may also be stores in the program/key store.

In another embodiment, the program for the host system can be a backup interface, a dating interface, a programming interface, or any interface adapted to run on the host system operating system (Windows, Linux, Android, iOS . . . )

The program store may request the system administrator or user to enter the operating system for the program.

The API (Application Programming Interface) is a code that can be integrated into a third-party application and that can run on a computer or mobile device. The code for the target system needs to be downloaded to the target system. The code for the host system API needs to be integrated into a user application or run on a computer. The code for the host system API interacts with the target system and obtains security information.

User interface program can be installed onboard the host system from the target system, from a CD, or from other medium such as Internet.

Thus the generic program/key DFU update of electronic devices is a robust method the updates electronic devices through program/key stores, that provides a robust method for updating electronic devices from Program Stores in a generic and reliable way that preserves security, reduces deployment and maintenance costs and adheres to standards.

It is noted that in case a target system is lost, a user can get a new target system, and can use the program/key store to restore it with the latest downloaded firmware. After pairing with second devices, the new target system will provide all the functions that the lost device. Furthermore, after un-pairing the old device, the old device will be unusable.

In one preferred embodiment, the target system operates as a Bluetooth headset using HFP protocol. Upon a press of a button, the target system encrypts signals from the microphone before sending them to the first mobile phone, and decrypts signals from the first mobile phone before sending them to the headset. A second target system working with a second mobile phone enables a second user to communicate with a first user, while at the same time, the signals transits in encrypted form over the mobile network, and between the first mobile phone and the second mobile phone. A number of target systems may enter in a conference call while the signals travel in encrypted form over the wireless network.

Numerous other modifications, variations, and adaptations may be made to the particular embodiment of the invention described above without departing from the scope of the invention, which is defined in the claims. Hence, while exemplary embodiments of the present invention have been set forth above, it is to be understood that the pioneer inventions disclosed herein may be constructed or used otherwise than as specifically described.

The invention claimed is:

1. A method for downloading entities from a program store to a target system through a host system comprising:
    using a program store to store a plurality of entities selected from a group consisting of:
        a program, a web page, an Application Programming Interface, a firmware, a digital key and a user information;
    using a host system to download at least one first entity from the program store to the host system;
    and using the host system to download at least one second entity from the host system to the target system;
        wherein the host system communicates with the target system using a cable means or using short wireless communication,
        and wherein said target system does not comprise any long range communication transceiver;
    whereby upon or after a program store listing is selected from the host system,
        download at least one first entity corresponding to the program store listing from the program store to the host system using a communication network,
        download at least one second entity corresponding to the at least one first entity from the host system to the target system,
            wherein the at least one first entity is different from the at least one second entity,
            and wherein the at least one first entity is adapted to run on the host system and the at least one second entity is adapted to run on the target system,
        whereby the at least one first entity and the at least one second entity enable the host system and the target system to exchange information using short wireless communication.

2. The method of claim 1 whereby
    the at least one second entity is signed with at least one second key,
    whereby a loader program running onboard the target system verifies that the at least one second key matches the at least one key stored onboard the target system,
    wherein if a match is not found,
        the downloading of the at least one second entity from the host system to the target system is not authorized.

3. The method of claim 2 whereby the at least one second entity is generated using Device Firmware Upgrade build tools.

4. The method of claim 2 comprising flashing a signed second entity to the target system.

5. The method of claim 1 comprising
    storing a loader program in the program store, adapting said loader program to execute on the host system.

6. The method of claim 1 comprising generating a configuration file.

7. The method of claim 1
whereby the at least one first entity correspond to an access interface adapted to run onboard the host system,
wherein said access interface is adapted to communicate with the target system using BLUETOOTH communication.

8. The method of claim 1 comprising
connecting the target system to a USB port onboard the host system.

9. A method for downloading entities from a program store to a target system through a host system comprising:
using a memory for storing at least one entity selected from a group consisting of:
a program, a web page, an Application Programming Interface, a firmware, a digital key and a user information;
using a host system to download at least one first entity from the program store to the host system;
and using the host system to download at least one second entity from the host system to the target system;
wherein the host system communicates with the target system using a cable means or using short wireless communication,
and wherein said target system does not comprise any long range communication transceiver;
whereby upon or after a program store listing is selected from the host system,
at least one user parameter is obtained,
at least one first entity corresponding to the program store listing is prepared for download to the host system,
wherein the at least one first entity is adapted to run on the host system,
and wherein the at least one first entity can comprise information corresponding to the at least one user parameter,
at least one second entity corresponding to the at least one listing is prepared for download to the target system,
wherein either the at least one first entity or the at least one second entity comprises information corresponding to the at least one user parameter,
and wherein the at least one second entity is adapted to run on the target system;
the at least one first entity and the at least one second entity are downloaded to the host system,
and the at least one second entity is downloaded from the host system to the target system,
whereby the at least one first entity and the at least one second entity enable the host system and the target system to exchange information.

10. The method of claim 9 comprising
generating a download file comprising the at least one first entity for download to the target system,
signing said download file.

11. The method of claim 9 comprising
generating an Application Programming Interface.

12. The method of claim 11 wherein said Application Programming Interface provides a function selected from the group consisting of
automatic login,
intelligent login,
data encryption,
data decryption,
data deletion,
generation of function codes for encryption,
generation of function codes and random numbers for encryption, collection of statistics,
locking access on detection of a BLUETOOTH signal drop,
sending a message to a server on detection of a BLUETOOTH signal drop.

13. The method of claim 9 wherein
the at least one first entity executes onboard the host system,
the at least one first entity transfers the at least one second entity from the host system to the target system.

14. The method of claim 9 wherein said listing parameters are selected from the group consisting of
user access privileges,
name of device that can be paired with,
class of service of device that can be paired with,
BLUETOOTH ID range of device that can be paired with,
maximum number of devices that can be paired with,
pairing window duration,
security protocol,
encryption protocol,
key generation protocol,
voice enabled/disabled,
voice encryption enabled/disabled,
proximity alarm enabled/disabled,
intelligent login enabled/disabled,
data deletion on detection of tempering enabled/disabled,
number of incorrect PIN code before lock,
number of incorrect responses before lock,
store download files enabled/disabled,
collect statistics enabled/disabled,
Operating System for the host system,
user name, account number, password, seed, algorithm, operation codes, PKI, firmware file, application file, API file, configuration data file, user thresholds.

15. A method for downloading entities from a program store to a target system through a host system comprising:
using a memory for storing at least one entity selected from a group consisting of:
a program, a web page, an Application Programming Interface, a firmware, a digital key and a user information;
using a host system to download at least one first entity from the program store to the host system;
and using the host system to download at least one second entity from the host system to the target system;
wherein said target system does not comprise any long range communication transceiver,
and wherein the host system communicates with the target system using a cable means or using short wireless communication;
whereby upon or after an application is selected from the host system,
at least one first entity corresponding to the application is prepared for download to the host system,
wherein the at least one first entity is adapted to run on the host system,
and wherein the at least one first entity can comprise information corresponding to at least one user supplied parameter, at least one second entity corresponding to the at least one first entity is prepared for download to the target system,
> wherein either the at least one first entity or the at least one second entity comprises information corresponding to the user supplied parameter,
> and wherein the at least one second entity is adapted to run on the target system;

the at least one first entity is downloaded to the host system, and the at least one second entity is downloaded from the host system to the target system, whereby the at least one first entity and the at least one second entity enable the host system and the target system to exchange information.

16. The method of claim 15 whereby a pass code is requested using an access interface onboard the host system, said access interface requests access information from the target system, if the pass code matches the access information from the target system, access is authorized.

17. The method of claim 15 whereby said first access interface is selected from the group consisting of:

interface for a door lock,
interface for a door unlock system,
interface for a motor start system,
interface for a switch,
and a login interface.

18. The method of claim 15 comprising retrieving a copy of a last firmware version corresponding to the target system from memory.

19. The method of claim 15 comprising obtaining a timeout period;

if the period since a pass code was last obtained exceeds said timeout period, a new pass code is requested.

* * * * *